(12) United States Patent
Blersch et al.

(10) Patent No.: US 6,775,471 B2
(45) Date of Patent: Aug. 10, 2004

(54) METHOD AND DEVICE FOR THERMALLY TREATING OBJECTS

(75) Inventors: Werner Blersch, Bussmannshausen (DE); Jochen Urban, Neu-Ulm (DE); Silke Paul, Ulm (DE); Uwe Ruby, Dornstadt (DE); Markus Hauf, Ichenhausen (DE)

(73) Assignee: Mattson Thermal Products GmbH (DE)

( * ) Notice: Subject to any disclaimer, the term of this patent is extended or adjusted under 35 U.S.C. 154(b) by 0 days.

(21) Appl. No.: 10/332,119

(22) PCT Filed: Jun. 29, 2001

(86) PCT No.: PCT/EP01/07435
§ 371 (c)(1),
(2), (4) Date: Mar. 5, 2003

(87) PCT Pub. No.: WO02/03160
PCT Pub. Date: Jan. 10, 2002

(65) Prior Publication Data
US 2003/0166317 A1 Sep. 4, 2003

(51) Int. Cl.[7] ................................................. F26B 3/30
(52) U.S. Cl. ........................ 392/407; 392/411; 392/416; 392/418; 219/390; 219/405; 219/419; 118/724; 118/725; 118/50.1
(58) Field of Search ................................ 219/390, 405, 219/411; 392/416, 418, 407, 411; 118/724, 725, 50.1

(56) References Cited

U.S. PATENT DOCUMENTS

| | | | |
|---|---|---|---|
| 4,761,538 A | 8/1988 | Chiba et al. | |
| 5,517,594 A | 5/1996 | Shah et al. | |
| 5,593,608 A | 1/1997 | Suzuki | |
| 5,634,590 A | 6/1997 | Gorski et al. | |
| 5,790,750 A | * | 8/1998 | Anderson .................... 392/416 |
| 5,895,596 A | 4/1999 | Stoddard et al. | |
| 5,994,675 A | 11/1999 | Bethune et al. | |
| 6,373,033 B1 | * | 4/2002 | de Waard et al. ........... 219/497 |

OTHER PUBLICATIONS

Article, thin solid Films, Model–based control in rapid thermal processing.

* cited by examiner

*Primary Examiner*—Shawnitina Fuqua
(74) *Attorney, Agent, or Firm*—R W Becker & Associates; R W Becker

(57) ABSTRACT

The invention relates to a method and to a device for thermally treating objects. The aim of the invention is to facilitate a better control of the temperature profile of an object to be thermally treated. To this end, the invention provides a method and a device for thermally treating an object in a heating system, especially for treating semiconductor wafers (2) in a rapid heating system (1). The objects are thermally treated at a predetermined temperature progression and the temperature of the object is controlled via a PID control and a feedforward control that are based on a simulation model of the heating system and the object. Said model consists of individual models of components of the heating system and/or the object. The parameters of at least one of the individual models are monitored during the thermal treatment and the model is adapted to the monitored parameters.

16 Claims, 6 Drawing Sheets

METHOD AND DEVICE FOR THERMALLY TREATING OBJECTS

Figure 1:
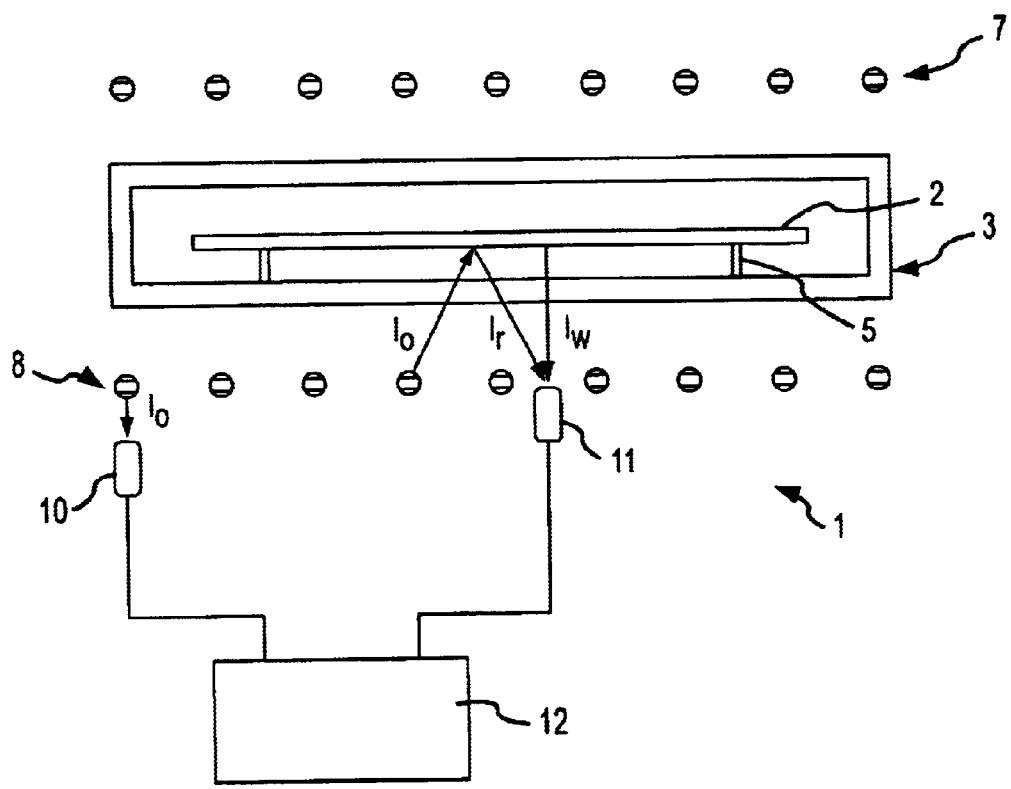

The present invention relates to a method and an apparatus for the thermal treatment of objects in a heating unit, especially semiconductor wafers in a rapid heating unit, according to which the objects are thermally treated with a prescribed temperature course, and the temperature of the object is regulated with an appropriate temperature regulation, e.g. a PID regulation and a forward-acting control that is based upon a simulation model of heating apparatus and object.

Such methods and apparatus are known in the art. For example, in the semiconductor industry for the manufacture of electronic components, it is customary to thermally treat disk-shaped semiconductor substrates via heat lamps having high heating rates of more than 100° C. per second. In this connection, the thermal treatment generally follows a prescribed chronological temperature profile. To achieve this temperature profile, a regulation of the heating power emitted from the lamps is necessary. Since the heating lamps are controlled with a prescribed power profile, the wafer temperature follows a specific temperature curve. However, in this connection one must take care that between the radiated power given off from the lamps and the temperature of the wafer there is no linear relationship, which is attributable to different effects, in particular the Stefan-Boltzmann principle, (as described, for example, in U.S. Pat. No. 4,761,538), but also, for example, the shape of a process chamber, the arrangement of various elements within the process chamber, the position of the wafer relative to the heating lamps, etc. Therefore, a simple control of the temperature profile via a prescribed control of the lamps is not possible.

For this reason, there is effected a constant monitoring of the wafer temperature at any given time along with simultaneous readjustment thereof if there is a deviation from a theoretical temperature value. In this connection, two different regulating processes are utilized, namely a closed temperature regulating circuit, e.g. a PID regulation on the one hand, and a so-called forward-acting control on the other hand.

In the following, one should speak of regulation if at least one parameter of a system should be brought to a value (or within an interval about this value), whereby this parameter is conveyed back to a regulating apparatus so that the regulating apparatus can adjust the desired value as optimally as possible as a function of the observed parameter of the system. In this connection, the parameter can be detected directly in the system, for example by measurement, although it can also result, for example, from a model that reproduces the system in as good a manner as possible. Here one speaks of model-based regulation. Similarly, with systems that are regulated with regard to several parameters, a combination of model-based and first-mentioned return of the parameters can be present. In general, one designates the return of such parameters as feedback coupling.

In contrast to the regulation, with the control the parameters of the system that are to be controlled are not returned to a control device. The parameters that are to be controlled are determined with the control device, e.g. by a model, and/or are controlled via some other parameter than the parameter that is to be controlled.

With a closed temperature regulating circuit, the actual value of the wafer temperature at any given time is compared with a prescribed theoretical or desired value. If deviations occur between the two values, a regulating apparatus becomes effective and takes care of an adjustment of the two values by more or less controlling, for example, the heating lamps. The greater the regulating difference is, the greater is the readjustment. Drawbacks of this regulation are a) that the regulating device is not informed about future changes of the theoretical value, and b) that the wafer characteristics are not taken into consideration, which can vary during the regulating process, for which reason such a regulation cannot react in an anticipatory manner.

These drawbacks are compensated for by a forward-acting control that in addition to a previous development, namely the theoretical value and the actual value at any given time, also draws in the future development of the theoretical value into the regulating process. As a consequence, the adaptation of the actual value to the theoretical value becomes more precise, since the regulating apparatus draws in future changes of the theoretical value into the regulation.

For an even more precise regulation, a future property of the theoretical value is calculated in advance, and in particular with the aid of a simulation model comprising heating apparatus and object or wafer that is to be treated. In this case, one speaks of forecast-regulated processes. Since the thermal capacities of individual chamber components are known, and it is known which lamp power is radiated into the chamber, the wafer temperature, as well as its future development, can be estimated in advance by the forecast of the simulation model as a function of the progress of the profile of the heating power.

This estimation, which up to now was effected upon a rigid simulation model, is, however, very difficult, since the different components in the process chamber, including the heating apparatus and the object that is to be treated, represent a non-linear system. Despite these difficulties, with this method the adaptation of the course of the wafer temperature to the threshold profile can be improved.

As already mentioned, such simulation models treat the chamber with all of its individual components and the wafer together as one system. There is no distinction between individual system components. Furthermore, the previously known simulation models are established one time and are subsequently not altered, especially not during a process, i.e. while the object experiences a temperature-time treatment. Alterations within the system, for example during the treatment of different wafers (objects) having different optical characteristics, cannot be taken into account. In particular, alterations caused by process progress and/or by aging, such as, for example, the radiation given off by a heating lamp or other alterations within the chamber, cannot be taken into account. Changes caused by the progress of the process are, for example, heating up of the process chamber, which is made, for example, of quartz glass, and the thermal radiation that additionally results therefrom and that is in a wavelength spectrum that in general differs from that of the lamp radiation.

Proceeding from this state of the art, it is therefore an object of the present invention to provide a method and an apparatus for the thermal treatment of objects in a heating unit that enables a better regulation of a temperature profile of an object that is to be treated.

Pursuant to the present invention, this object is realized in that the simulation model includes at least one individual model that includes components of the heating apparatus and/or of the object, and in that at least one parameter of at least one of the individual models is monitored during the thermal treatment and in that the simulation model is adapted to at least one of the monitored parameters. This results in the advantage that the simulation model can be dynamically adapted to varying operating conditions, such as, for example, alteration of the heating power of the lamp due to age, objects having different optical characteristics, etc. Due to the adaptation of the simulation model, a more precise regulation of the temperature curve of the object that is to be treated is in particular also possible for the reason that advantageously alterations that are due to the progress of the process, such as, for example, the aforementioned heating up of, for example, process chamber (especially also the quartz components contained therein) can also be taken into consideration during the temperature regulation. This can be utilized advantageously, for example, for the reduction of the so-called "first wafer" effect. This involves the influence of the process chamber temperature upon the process result during the processing of wafers if, for example, during the processing of the first wafer the process chamber has not yet reached its average "operating temperature". This effect always occurs at the beginning of, for example, a mass production, or if between the processing of individual wafers there is so much time that the process chamber can cool off to temperatures that are below that of, for example, mass production. As a result, due to the equipment, the process results can be a function of the throughput of the wafers, which of course is not desired. Pursuant to one preferred embodiment of the invention, the object is irradiated with at least one heating lamp of a heating device. An individual model having at least one monitored parameter is preferably provided for at least one heating lamp of the heating device, and operating parameters of the heating lamp, in particular the irradiated heating power in relation to the control power, are monitored in order to discover alterations and if necessary adapt the simulation model.

Pursuant to a further preferred embodiment of the invention, an individual model is provided for the object that is to be treated, and parameters of the object that is to be treated, especially optical characteristics thereof, are monitored in order to undertake, if necessary, an adaptation of the simulation model. Of particular significance are the absorption characteristics (or in general the optical characteristics such as transmission, absorption or reflection) of the object that is to be treated or the coupling to the heat radiation at different temperatures, which can greatly influence the regulation, especially a forward-acting control, since these characteristics are greatly temperature dependent for, for example, Si wafers. The parameters are preferably separately determined from one another on opposite sides of the object.

For a further optimization of the overall model, the data transmission times and/or the computing times are determined and individual models provided herefor are adapted to the determined values. With some measuring devices, such as, for example, pyrometers, a temperature determination of the object is not possible, or is only possible with great difficulty, below 400° C. Therefore, the temperatures of the object under 400° C. are preferably calculated at a later stage with the aid of the simulation model, and this calculated information is taken up in the regulation.

The object of the invention is also realized with an apparatus for the thermal treatment of objects, especially semiconductor wafers, with a heating device, especially a rapid heating device, a regulating unit having a temperature regulator, and a forward-acting control that utilizes a simulation model of heating apparatus and object, in that a monitoring unit is provided for the sensing of parameters of components of the heating device and/or of the object, which parameters are relevant for the simulation model, for the comparison of the measured parameters with the parameters of the simulation model and for the adaptation of the parameters of the simulation model to the measured parameters. With this apparatus there result the advantages already mentioned above with reference to the method.

Figure 2:
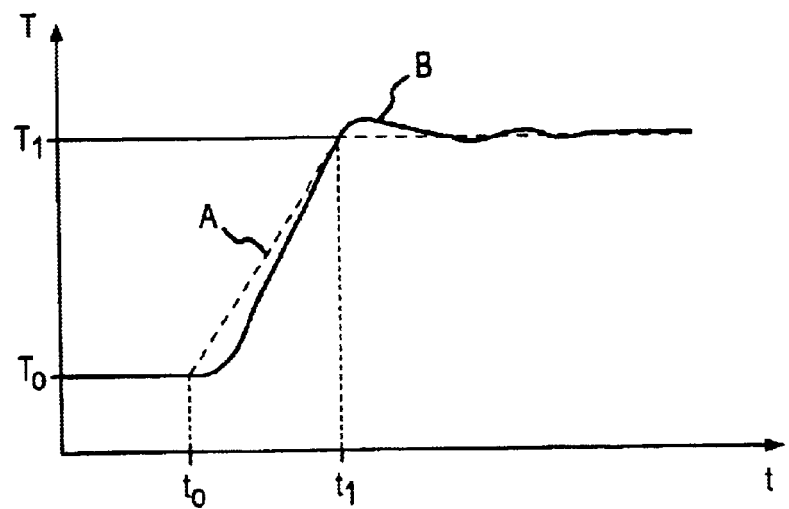
Figure 3:
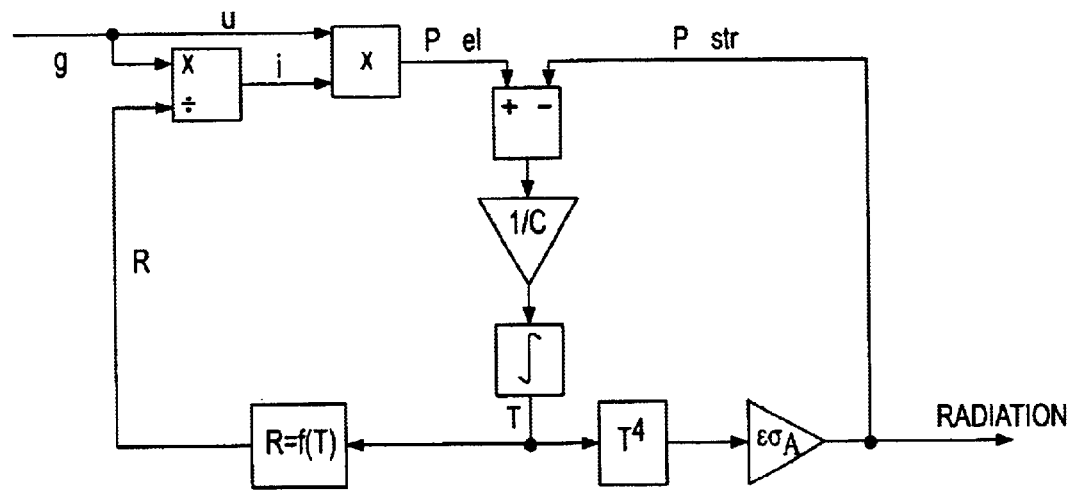
Figure 4:
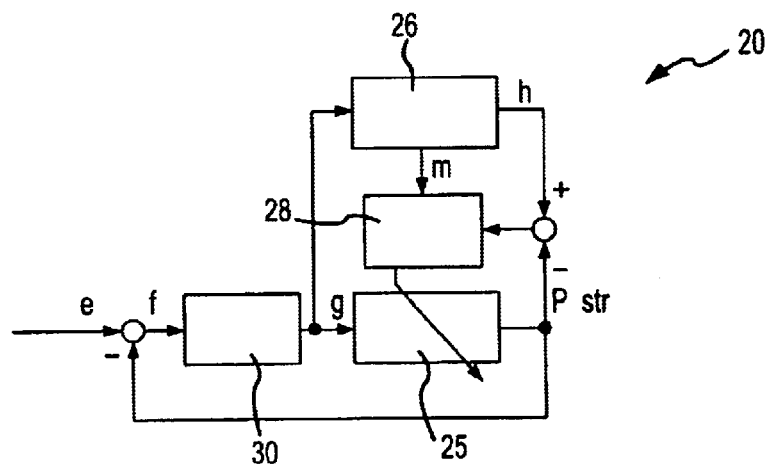
Figure 5A:
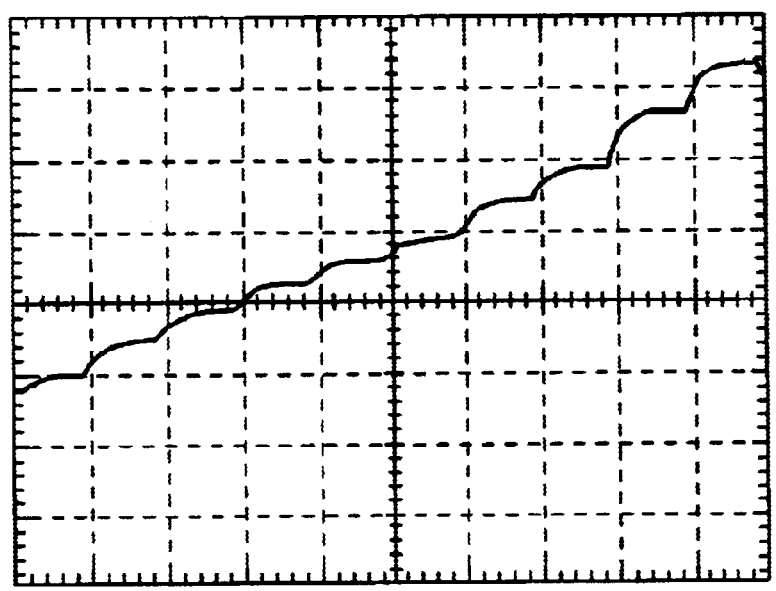

The invention will be explained in greater detail subsequently with the aid of the drawing; in the drawing there is shown:

FIG. 1 Schematically the structure of a heating apparatus for the thermal treatment of objects;

FIG. 2 A graph of a theoretical and an actual temperature profile during a thermal treatment of a semiconductor wafer with PID regulation;

FIG. 3 A graph for the determination of the radiation generated from a lamp;

FIG. 4 A graph of a lamp model in a regulating circuit;

FIGS. 5a, b Curves that show the lamp radiation during voltage jumps without radiation regulator during a heating up phase or during a cooling off phase.

Figure 6A:
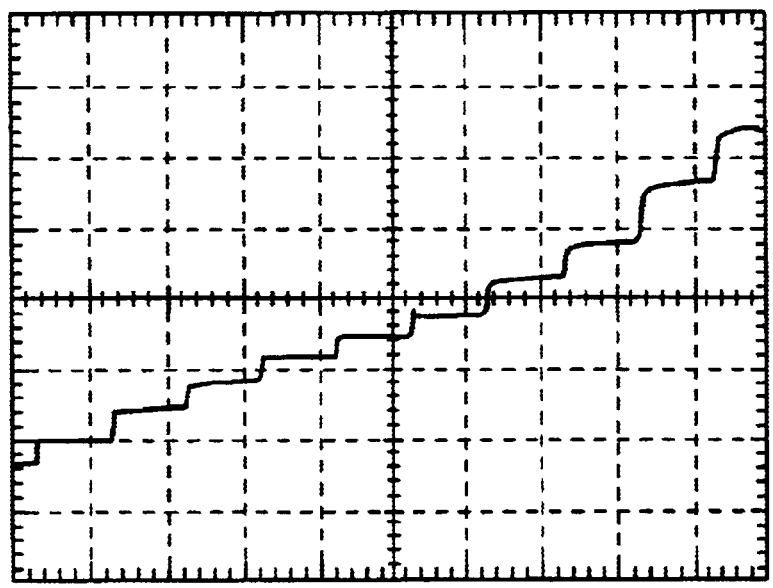
Figure 7:
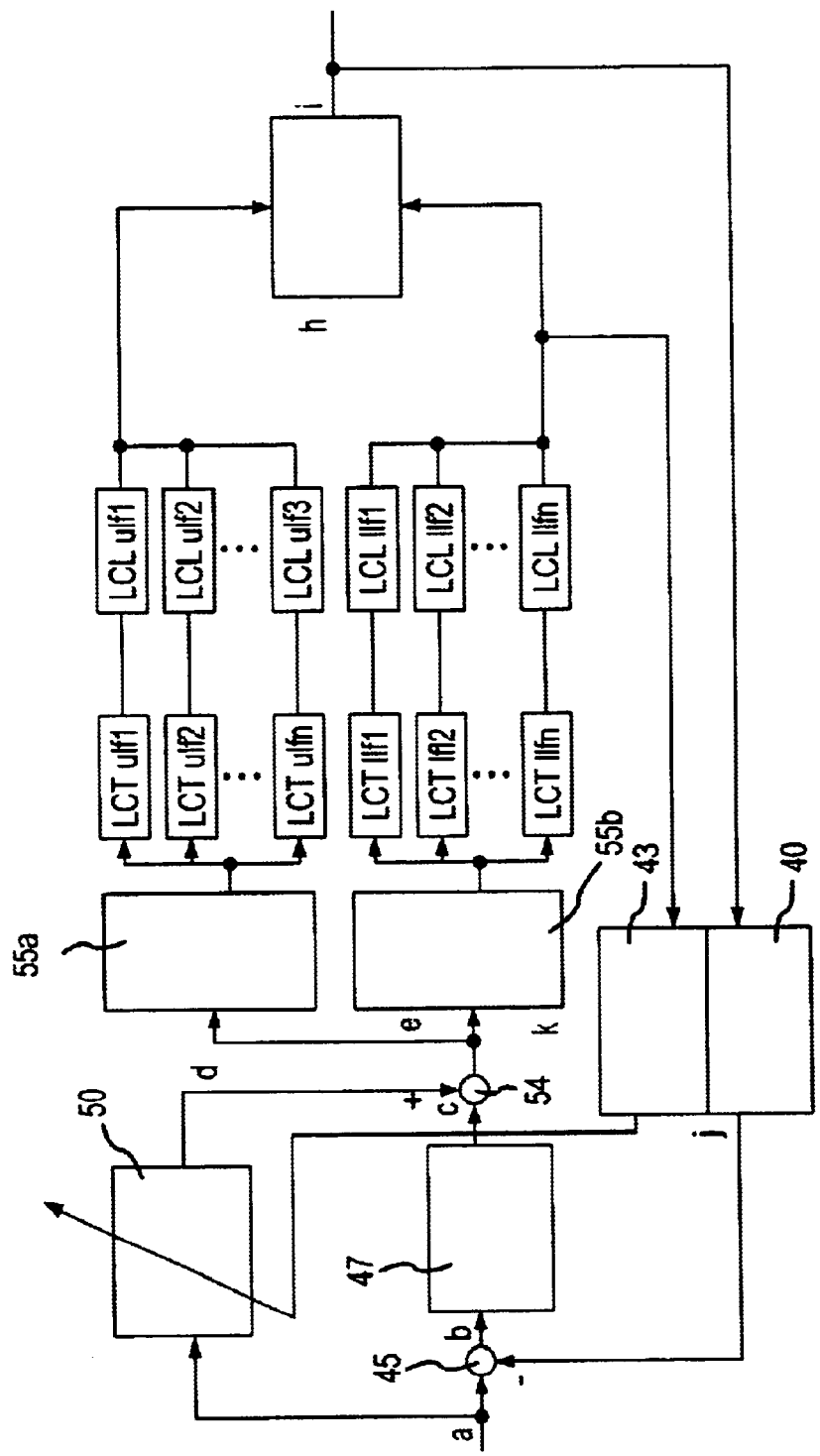
Figure 8:
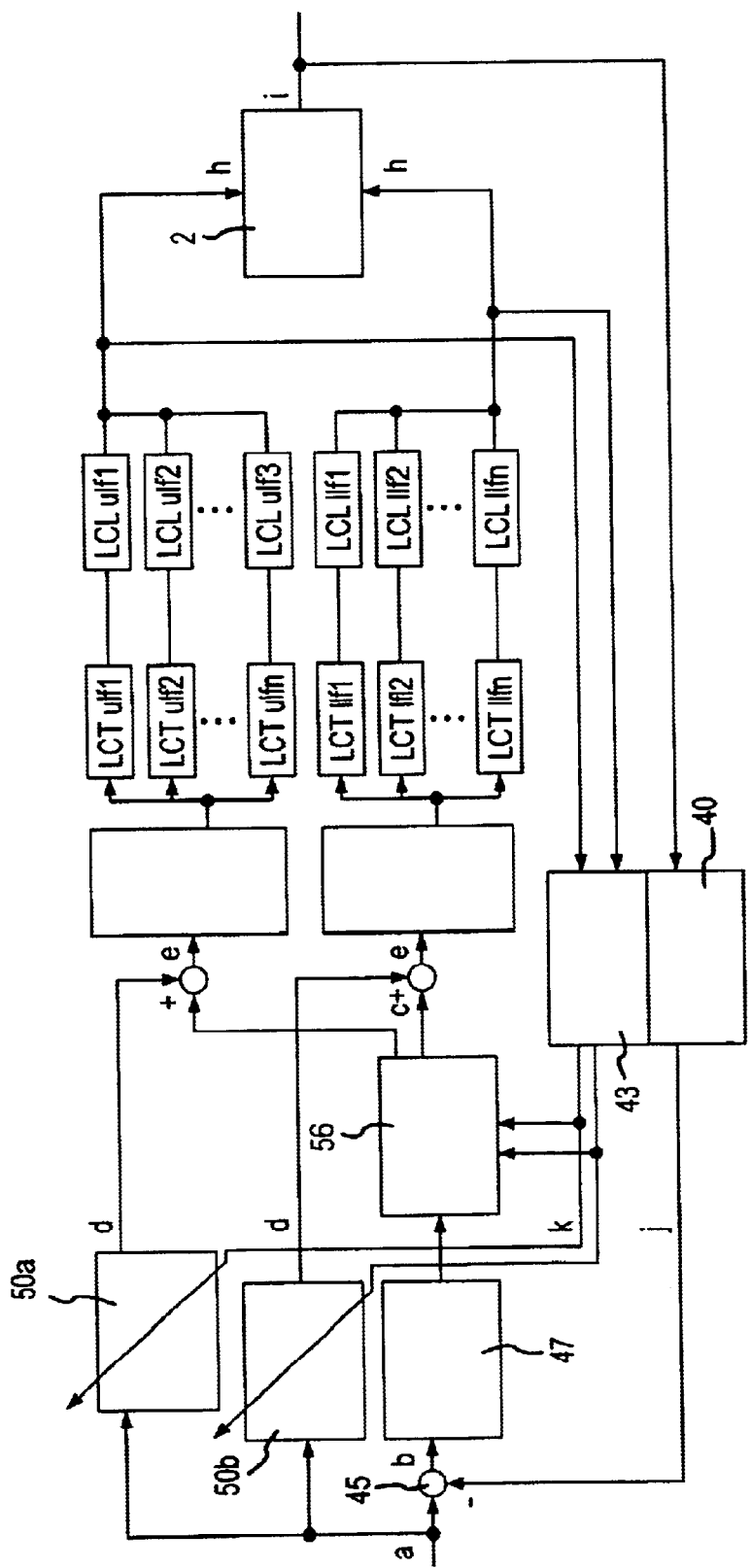

FIGS. 6a, b Curves similar to those of 5a and b that show the power jumps with radiation regulators;

FIG. 7 A graph of a preliminary control unit;

FIG. 8 A graph of an expanded preliminary control unit.

FIG. 1 schematically shows the structure of a heating apparatus 1 for the thermal treatment of semiconductor wafers 2. The apparatus 1 has an inner process chamber 3 that is generally made of quartz glass and is provided with support elements 5 for receiving the semiconductor wafer 2.

Provided above and below the process chamber 3 are banks of lamps 7 and 8 that are formed by a plurality of rod-shaped lamps, such as, for example, tungsten-halogen lamps or arc lamps. However, it is also possible to provide only a single bank of lamps, e.g. for heating an object on one side. Of course, other lamps can also be used. For the thermal treatment of the wafer 2, the lamps are controlled in such a way that they give off a specific electromagnetic radiation that can be controlled not only with regard to the spatial and/or spectral composition thereof, but also with regard to the intensity thereof.

During the thermal treatment, the temperature of the wafer is measured. For this purpose, two pyrometers are provided, a lamp pyrometer 10 on the one hand and a wafer pyrometer 11 on the other hand. The lamp pyrometer 10 measures the electromagnetic radiation intensity $l_0$ given off by at least one lamp, while the wafer pyrometer 11 measures the radiation intensity $l_w$ given off from the wafer 2 as well as a radiation intensity $l_r$ reflected at the wafer 2, and possibly also a radiation transmitted through the wafer. The radiation intensity $l_0$ given off by the lamps has a certain modulation that is either active, i.e. by directed, defined and/or controllable modulation of the radiation, or passive, i.e. achieved by utilization of system-dictated radiation changes, that result, for example, from the frequency of the voltage supply. This modulation can also be recognized in the radiation intensity $l_R$ reflected at the wafer 2, and therefore that portion of the thermal radiation measured at the wafer pyrometer 11 that is actually given off from the wafer 2 can be determined in a signal analyzer 12 to which are conveyed not only the signals of the lamp pyrometer 10 but also of the wafer pyrometer 11. Details of this measuring method are described, for example, in DE-A-198 55 683, which is attributable to the same applicant, and to which reference is made to this extent in order to avoid repetition. The temperature measured in this manner is compared with a desired wafer temperature in connection with, for example, a PID regulation, a regulation value for the banks of lamps 7,8 is determined, and they are accordingly controlled.

FIG. 2 shows the theoretical or desired temperature curve A and the actual temperature curve B of a wafer during a conventional thermal treatment. The dashed-line curve A shows the desired or theoretical temperature curve for the wafer, and the solid-line curve B shows the actual temperature curve of the wafer. The dashed-line curve initially shows a constant temperature $T_0$ that increases at a constant rate, for example of 100° C. per second, in a time interval between $t_0$ and $t_1$ to a temperature $T_1$, and subsequently remains constant at this temperature. With the above-described regulation according to the state of the art, e.g. with a pure PID regulation, the actual temperature curve of the wafer does not follow this linear curve. Rather, heating up of the wafer starts only at a later point in time than is the case with the theoretical curve. The heating up rate for the actual curve is then greater than that with the theoretical curve, and the actual curve goes beyond the desired end temperature $T_1$ of the wafer and levels out at the desired final temperature $T_1$ only sometime after the point in time $T_1$.

As previously mentioned, the differences between the theoretical and actual curves can be improved by the additional incorporation of a forward-acting control that draws in or integrates a future development of the theoretical value into the regulation, as well as calculates in advance a future characteristic of the actual value with the aid of a simulation model. The simulation model used up to now in this connection is, as mentioned a rigid simulation model.

Pursuant to the present invention, the simulation model that is the basis of the regulation is improved in that an adaptation of the simulation model, in particular an adaptation during the processing sequence, to varying parameters is made possible. This is achieved in that the simulation model is split up into components, and for at least one, but also for each, component of the model a suitable single model is developed, and in that a measurement of at least one parameter of this individual model or of the individual models, as well a subsequent adaptation of parameters in the individual model, is effected during the process.

Due to this overall model, regulation parameters can be established for the individual components that are finally stored in a regulation apparatus of the overall unit. In this way, the temperature curve of a wafer can be controlled and regulated in a precise manner via the individual models and their regulation parameters. The overall model can be adapted to varying conditions, such as, for example, variations and changes of the measured parameters.

For the better understanding of the invention, the FIGS. 3 to 8 will be subsequently considered. FIG. 3 shows a diagrammatic illustration for the determination of the radiation generated from a lamp via a combination of model, measurement and adapted model, with the integration thereof in a subordinated radiation-regulating circuit. A lamp model is initially established on a basis of the specific properties of the lamp. Characteristic properties of a lamp to be used as model parameters include the current flowing therethrough, the applied voltage, its resistance, the received power and the emitted radiated power. In the static situation, the received electrical power of the lamp is the same as the emitted power. In addition, the emitted radiated power of the lamp is correlated via the filament temperature directly with its resistance. Based upon this interrelationship, one can establish the lamp model shown in FIG. 3, as it is also described, among others, in J. Urban et al. in the article "Thermal Model of Rapid Thermal Processing Systems" in the $7^{th}$ International Conference on Advanced Thermal Processing of Semiconductors—RTP'99, which to this extent is made the subject matter of the present invention in order to avoid repetition. With this model, a single lamp is specified by three parameters, namely its resistance characteristic R=f (T) as a function of its temperature T, its thermal capacity C (possibly also as a function of the temperature T), and a constant $\in \sigma A$ that determines the irradiation power. In this connection, $\in$ corresponds to the degree of emission, the $\sigma$ corresponds to the Stefan-Boltzmann-constant and A corresponds to the surface area, i.e. the effective surface area of the lamp filament.

Input into the lamp model, as the adjustment value g, is the voltage u applied to the lamp. From the voltage and the resistance R, which the lamp has in conformity with its characteristic at a temperature T, the magnitude of the current i flowing through the lamp is determined. Pursuant to $P_{el}=u\,i$ there is determined therefrom the electrical power $P_{el}$ that circulates in the lamp. With the aid of the radiation principle of Stefan-Boltzmann, one can determine the radiation power $P_{str}$ emitted from the lamp with the aid of the lamp temperature and the radiation constants (emission constants). The radiation power is subtracted for the circulating electrical power, as a consequence of which one obtains the portion of the power that was converted in the lamp into heat, and that heated the filament and the lamp. By means of the thermal capacity c of the lamp, that is essentially prescribed by the dimension of the filament wire, a new temperature of the lamp is calculated. This is illustrated in FIG. 3 by the 1/c and by the integral element. With the aid of the new temperature, a new filament resistance R of the lamp, and therefrom the converted lamp power $P_{el}$, is redetermined, and in addition the emitted lamp radiation $P_{str}$ is redetermined. In this manner, the influence of the adjustment value g upon the radiation power $P_{str}$ emitted from the lamp is determined, in particular, the dynamic characteristic of the lamp is described.

In a following step, the parameters taken up in the lamp model for a prescribed lamp are measured. In this way, the model can be optimized and can be established for a specific lamp. In particular, the dependence of the resistance upon the filament temperature, the thermal capacity C of the filament, as well as the constants $\in \sigma A$ are determined, whereby c, $\in$ and A can also be determined as a function of the temperature. Optimally, $\in$ and A can also be adapted to the temperature. The determined parameters are inserted into the lamp model, resulting in a specific model for the lamps.

The use of the lamp model of FIG. 3 is illustrated in a regulating circuit 20 in FIG. 4. In the regulating circuit 20, the radiated power $P_{str}$ (here as monitored parameter of the lamp model) calculated on the basis of the lamp model 25 is compared one time with the actual lamp radiation h measured via a pyrometer 26. The difference between calculated and measured lamp radiation serves for the further optimization of the lamp model 25 via a model-optimizing unit 28 that takes care of an adaptation of, e.g., R, $\in$, A or c. In addition, the calculated radiated power $P_{lst}$ (=$P_{str}$) is compared with a theoretical radiation value e, and the lamp radiation is regulated with the aid of the determined difference via a radiation regulator 30. The adjustment value g given off by the radiation regulator 30, and which corresponds to an effective voltage, serves in addition to the control of the lamps also as an input value for the lamp model. As gleaned from the above description, the lamp model, which is used with the regulation of the temperature of a wafer, can be dynamically adapted to varying conditions in that the radiated power actually given off by the lamps is compared with the radiated power calculated within the model. In addition, or alternatively, during the process one can measure other lamp parameters m, such as, for example, current or voltage, and the lamp model can be optimized with the aid of the measured parameters. However, it is also possible to initialize the lamp model at the beginning with the measured parameter values, and to dispense with a process-accompanied optimization of these values.

With the above described method it is of particular importance that the adjustment value g, which serves for the lamp control, no longer be determined, as was previously customary, on the basis of a comparison between the theoretical radiation value e and a measured real lamp radiation value, but rather results from the theoretical radiation value e and the radiated power $P_{str}$ calculated from the lamp model. This leads to an increase of the regulating speed, and furthermore few disruptions result within the regulating process.

Figure 5B:
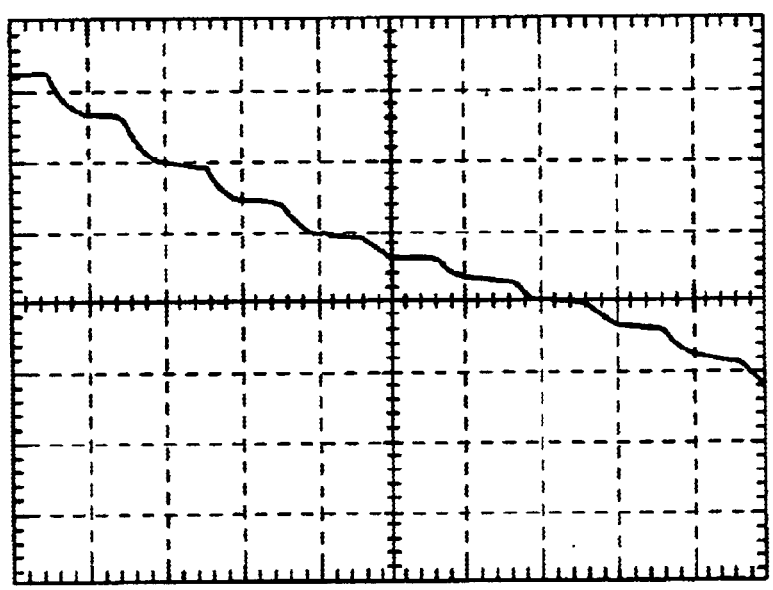

The effect and advantage of the above-described regulation is illustrated in the oscillogram images 5a,b and 6a,b. In the FIGS. 5a and 5b, the lamps were controlled in a conventional manner via the voltage as an adjustment value and without a radiation regulator (lamp model, lamp model-optimizing unit). In this connection, FIG. 5a shows an increasing radiated power, and FIG. 5b shows a reducing radiated power. In this connection, the voltage was varied in a stepped manner. As one can see from the oscillogram images, the power radiated from the lamp mirrors this stepped curve of the voltage only in a greatly independent manner. Instead of a stepped alteration of the lamp radiation intensity, a wave-shaped curve can be seen.

Figure 6B:
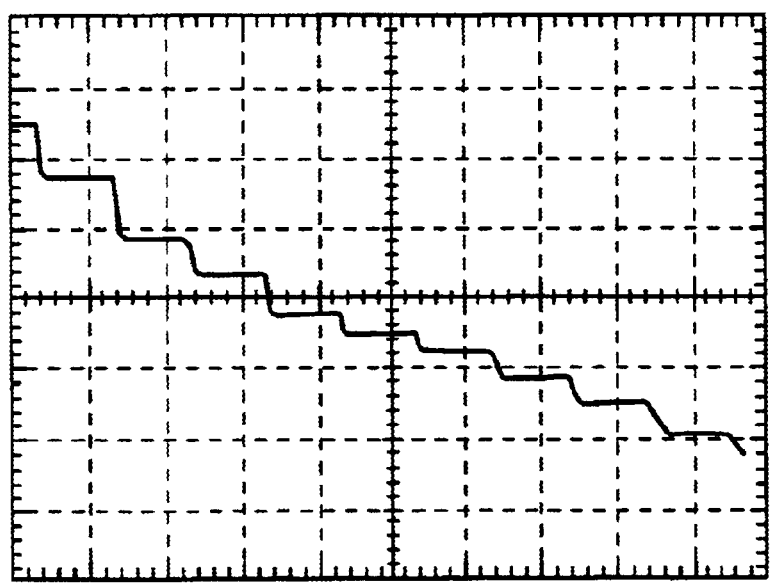

FIGS. 6a and 6b again show the chronological curve of the emitted radiation of a lamp, once during increase (FIG. 6a) and once during reduction (FIG. 6b) of the lamp power. In this case, the lamps were controlled via the regulating circuit illustrated in FIG. 4. The curve of the radiation intensity shown in FIGS. 6a and 6b shows a stepped curve. A radiation regulator was utilized and the radiation intensity calculated from the model was provided as the adjustment value. During comparison of the oscillogram images of FIGS. 5a,b and 6a,b, one should note that the Y axes show different high values. This results from the fact that during the voltage jumps it is really only the voltage that is varied as an adjustment value, whereas with the power jumps a theoretical value is prescribed for the radiated power. On the whole, lamps that are controlled (FIG. 6a,b) via the regulating circuit illustrated in FIG. 4, represent adjustment elements having a more dynamic characteristic. With them, the temperature curve of the wafer can also be adapted more exactly to a prescribed temperature profile.

During the thermal treatment of a wafer, each individual lamp of the lamps of a heating apparatus can be individually regulated in this manner.

FIG. 7 shows a preliminary control that is adapted to the characteristics of the wafer and includes a preliminary control regulator that contains a model of the wafer. In the illustrated regulation, the coupling of the wafer to the lamp radiation is measured, and with the aid of the measured coupling a preliminary control adapted to the wafer is produced. The preliminary control regulation generates an adjustment value for the individual lamps or banks of lamps that is a function of the temperature, the temperature alteration, the wafer size, and possibly other wafer characteristics.

A radiation i emitted and reflected from the wafer is measured in the measuring unit 40 and is utilized for the calculation of the wafer temperature j. The radiation i emitted from the wafer is furthermore compared in a coupling measuring unit 43 with a measured lamp radiation h, as a result of which a coupling k of the wafer to the lamp radiation can be determined. For the determination of the coupling k of the wafer to the lamp radiation, a broadband actively modulated measurement of the radiation emitted from the lamps and from the wafer is utilized. The measurement is effected with two pyrometers, as is known from DE-A-198 55 683.7, which is attributable to the same applicant; this disclosure is to this extent made the subject matter of the present invention in order to avoid repetition. The magnitude of the coupling k between wafer and lamp radiation is a function of various parameters. For example, the wafers can even be multiply coated and/or structured with various materials, which in addition to the problem of different absorption properties and non-homogeneous temperature distributions over the wafer surface, can also lead to interference effects of the thermal radiation at these layers. It should be noted that the term the coupling k between wafer and lamp radiation refers to the degree of the alternating effect between the wafer and the radiation field, in other words, its degree of absorption and emission over all occurring wavelengths.

At the point 45, the calculated wafer temperature j is compared with a theoretical temperature value a. A difference from theoretical value and actual value is conveyed further to a temperature regulator, e.g. a PID temperature regulator 47, which on the basis of the difference b determines a lamp control value c in a known manner. The theoretical value a and the calculated coupling k between the wafer and the lamp radiation are conveyed to a preliminary control regulator 50, which delivers a preliminary control value d as a function of the wafer characteristic k. The preliminary control value d, and the output value c of the temperature regulator, are added at the point 54 to an adjustment value e, so that the actual adjustment value e results from calculations that were determined on the basis of the last measurement. In this connection, the basic model can also contain other parameters of the chamber, the holding device or the lamps, such as, for example, the quartz temperature, ambient temperature, etc. The adjustment value e is conveyed further to the regulator 55a, 55b for the upper and lower bank of lamps.

All of the lamps disposed above the wafer are combined to the upper bank of lamps 7, and the lamps disposed below the wafer are combined to the lower bank of lamps 8. Each of the n lamps of the upper and lower bank of lamps has an individual regulating circuit (LCL) as was described in conjunction with FIG. 4. During the heating up in a homogeneous lamp field, the edge regions of a disc-shaped wafer heat up more intensely than does the center of the wafer. For the achievement of a homogeneous temperature distribution over the wafer, individual lamps of the banks of lamps must therefore be radiated very differently. For this purpose, control tables (LCT) are provided for the individual lamps. With the aid of the control tables, the radiation intensity of each individual lamp is set during a thermal treatment. The adjustment devices required for this precede the regulating circuits of lamps. They are controlled via the adjustment value e, and take care of a desired lamp radiation h. Since the respective lamps exhibit a different dynamic characteristic in different situations, it is particularly advantageous that each lamp with the aid of its individual characteristic, be controlled with an individual regulating circuit pursuant to FIG. 4. In this way, a more homogeneous heating up of the wafer is achieved, especially in the edge regions. Due to the measured parameters h and l, which provide an indication about the coupling of the wafer to the lamp radiation, one obtains information concerning the model parameters of the lamp model that can be adapted thereto. In particular if the lamps are arc lamps, this method is very advantageous. It should be noted that the control tables (LCT) themselves can again be described by an individual model that in turn can be monitored and adapted via at least one parameter (e.g. the radial wafer temperature).

Since the wafer radiation i is the value that is to be regulated, because it permits an indication about the wafer temperature, and the coupling measuring unit 43 compares this radiation i with the lamp radiation h, what is involved is a control having feedback coupling. The lamp radiation h itself is not regulated in the sense understood here, with its aid the value i that is to be regulated is merely brought to a desired value. For this purpose, the lamp radiation h can in principle assume any course that leads to the prescribed value of the parameter i that is to be regulated; it is only an auxiliary parameter. In contrast, the wafer radiation j that is to be regulated is supplied to the measuring unit 40. Here one sees a regulation in the above-defined sense.

Aging effects of lamps due to long service life can be rapidly compensated for without great expense by a simple adaptation of their model with new parameter values. A dynamic adaptation of the lamp parameters in a lamp model with the aid of measured parameters is also very advantageous during a possible exchange or replacement of lamps. Up to now, in such a case a new model having appropriate tables had to be prepared. During the dynamic adaptation, however, the lamp can be automatically measured and the model can automatically adapt itself. By means of such a model adaptation, the lamps can also advantageously remain in use for a longer period of time. Furthermore, monitored parameters, such as, for example, the $P_{str}$ from FIG. 4, or individual model parameters or model parameters dependent thereon, can serve for monitoring the rapid heating unit, so that, for example, a replacement of lamps can be indicated if individual model parameters are outside of predefined or adapted threshold ranges.

With the preliminary control illustrated in FIG. 7, only the coupling of the underside of the wafer to the lamp radiation is taken into account.

FIG. 8 shows a system with which, in addition to the coupling of the underside of the wafer, also the coupling of the upper side of the wafer to the lamp radiation is taken into account. In FIG. 8 the same reference symbols are used as in FIG. 7 to the extent that the same or similar elements are concerned.

A separate observation of the coupling is particularly advantageous with wafers where the upper side and the underside have different material coatings and therefore the optical characteristics of the wafer are different on both sides. In particular in the semiconductor industry, in many cases the front sides of the wafer are provided with one or more layers of different materials, while the back sides of the wafer are not treated. In addition, one of the surfaces can be provided with microscopic structures, while the other surface is flat. If one takes these differences into account in two different models for the preliminary control, the regulation of the wafer temperature can be improved still further. Since the coupling of the wafer to the lamp radiation results from an average value of the front and the rear side, the preliminary control value can be determined from the average value of the two coupling measurements that are independent of one another.

As is illustrated in FIG. 8, the radiation h emitted from the upper and from the lower banks of lamps are determined separately, and are relied upon for a determination of the coupling between lamp radiation and wafer. From these values there result different adaptations of the forward acting regulation for the upper and the lower lamp banks in the preliminary control regulators 50*a* and 50*b*. Furthermore, there results a different control of the upper and lower banks of lamps via a distribution unit 56.

Due to the different determinations for the adjustment values of the lamp radiation for the upper and lower lamp banks, a more uniform heating up of the front and rear sides of the wafer 2 is ensured. This is particularly advantageous for very small structures.

The invention has previously been described with the aid of preferred embodiments of the invention, without thereby being limited to these embodiments. For example, pursuant to a further embodiment data transmission devices as well as computing times of individual system components can be taken into account and can flow as parameters into the model for the preliminary control. The measurement of unit parameters that have no direct relationship to the adjustment value can also be advantageous. For example, impurities or contaminations of the quartz chamber that occur during the course of the process, and that affect the transmission of the lamp radiation, can be provided in the model by suitable parameters that are then detected by measurements, e.g. by reflection or transmission measurements, and then affect the regulating circuit. For an ideal temperature control of the wafer, as many individual components of the system as possible should be taken into account, whereby here a compromise must be found between regulating expense and success. Furthermore, as above with the aid of the lamp model or the (individual) models, system monitoring functions such as, for example, monitoring integrals can be integrated. Finally, the individual features of the above-described embodiments can be combined with one another.

What is claimed is:

1. A method of thermally treating semiconductor wafers in a rapid heating unit, said method including the steps of:

thermally treating said wafers with a prescribed temperature progression;

regulating the temperature of said wafers with a temperature regulation and a forward-acting control that are based upon a simulation model of said heating unit and a semiconductor wafer, wherein said simulation model includes at least one individual model that includes components of at least one of said heating unit and said wafer; and monitoring at least one parameter of at least one of said individual models during said thermal treatment, wherein said simulation model is adapted to at least one of said monitored parameters.

2. A method according to claim 1, wherein said semiconductor wafer is irradiated with at least one heating lamp.

3. A method according to claim 2, wherein an individual model is provided for at least one heating lamp, and wherein at least one operating parameter of said heating lamp is monitored.

4. A method according to claim 3, wherein the irradiated heating power of said heating lamp is monitored.

5. A method according to claim 1, wherein at least one parameter of said wafer is monitored.

6. A method according to claim 5, wherein the optical characteristics of said wafer are monitored.

7. A method according to claim 5, which includes a coupling of said wafer to heat radiation.

8. A method according to claim 5, wherein parameters on opposite sides of said wafer are determined separately from one another.

9. A method according to claim 1, which includes a step of determining at least one of data transmission times and computing times.

10. A method according to claim 1, which includes the step of calculating temperatures of said wafer below 400° C. at a later stage.

11. An apparatus for thermally treating semiconductor wafers, comprising:

a heating unit;

a regulating unit having a PID regulator and a forward-acting regulator that utilizes a simulation model of said heating unit and a semiconductor wafer; and at least one monitoring unit for sensing such parameters of components of at least one of said heating unit and said wafer that are relevant for said simulation model, and for comparing the sensed parameters with parameters of said simulation model and adapting the parameters of said simulation model to the sensed parameters.

12. An apparatus according to claim 11, wherein said heating unit is a rapid heating unit.

13. An apparatus according to claim 11, wherein said heating unit includes at least one heating lamp.

14. An apparatus according to claim 13, wherein said monitoring unit is provided with at least one sensor for measuring operating parameters, especially irradiated heating power, of at least one heating lamp.

15. An apparatus according to claim 11, wherein said monitoring unit is provided with at least one sensor for measuring parameters of said wafer, especially optical characteristics thereof.

16. An apparatus according to claim 15, wherein said two sensors are provided for determining parameters on opposite sides of said wafer.

* * * * *

UNITED STATES PATENT AND TRADEMARK OFFICE
CERTIFICATE OF CORRECTION

PATENT NO. : 6,775,471 B2
DATED : October 10, 2004
INVENTOR(S) : Blersch et al

It is certified that error appears in the above-identified patent and that said Letters Patent is hereby corrected as shown below:

Title page,
Item [54], title of invention, should read:
[54] Title: METHOD AND APPARATUS FOR THERMALLY TREATING OBJECTS

Signed and Sealed this

Twenty-first Day of September, 2004

JON W. DUDAS
*Director of the United States Patent and Trademark Office*

UNITED STATES PATENT AND TRADEMARK OFFICE
CERTIFICATE OF CORRECTION

PATENT NO.     : 6,775,471 B2                                                Page 1 of 1
DATED          : August 10, 2004
INVENTOR(S)    : Blersch et al.

It is certified that error appears in the above-identified patent and that said Letters Patent is hereby corrected as shown below:

<u>Title page</u>,
Item [30], should read:
-- [30]           Foreign Application Priority Data
      July 4, 2000        (DE) ..................... 100 32 465 --

Signed and Sealed this

Twenty-eighth Day of December, 2004

JON W. DUDAS
*Director of the United States Patent and Trademark Office*